Sept. 4, 1956
M. C. BAKER
2,761,311
PIPE COLLAR TESTER
Filed Feb. 23, 1954
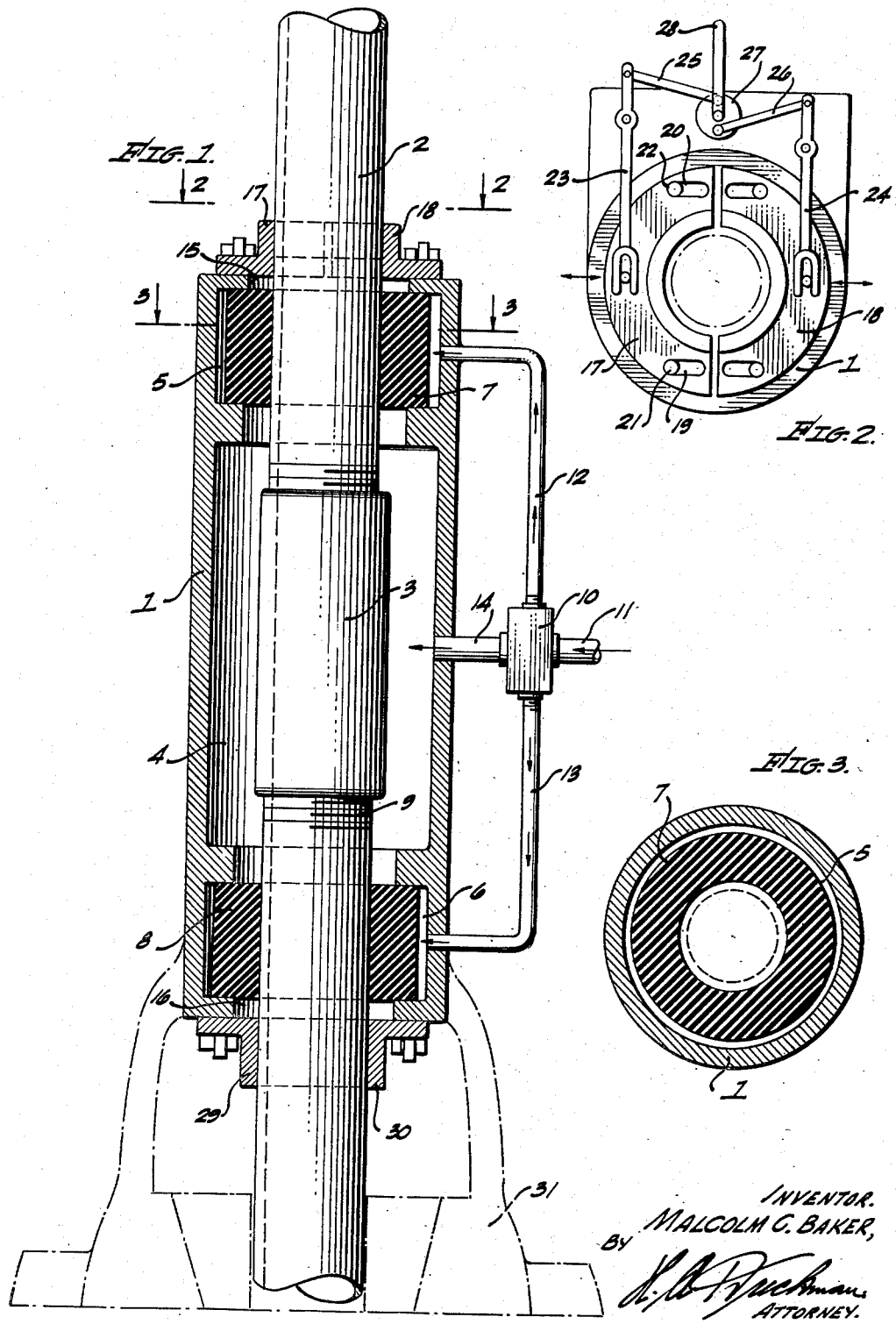
INVENTOR.
MALCOLM C. BAKER,
BY
ATTORNEY.

United States Patent Office 2,761,311
Patented Sept. 4, 1956

2,761,311

PIPE COLLAR TESTER

Malcolm C. Baker, Long Beach, Calif.

Application February 23, 1954, Serial No. 411,835

3 Claims. (Cl. 73—46)

This invention relates to a pipe collar tester whereby the collar connecting lengths of pipe may be tested to insure there is no leakage around the threads of the collar or the pipe.

An object of my invention is to provide a novel pipe collar tester in which a packing means is provided at both ends of the collar, sealing off a space between the packing means and around the collar so that fluid pressure may be applied to the collar for the purpose of discovering any leaks in the collar or around the threads.

Another object of my invention is to provide a novel pipe collar tester in which fluid under pressure is introduced against a packing means encircling the pipe, and the fluid pressure is also introduced to the area around the collar for the purpose of testing that collar.

Still another object of my invention is to provide a novel pipe collar tester in which the spaced packing in the tester is annular in shape and encircles the pipe, and is pressed inwardly against the pipe by fluid pressure, and is disengaged from the pipe when that fluid pressure is relieved.

Other objects, advantages and features of invention may appear from the accompanying drawing, the subjoined detailed description and the appended claims.

In the drawing:

Figure 1 is a longitudinal sectional view of my pipe collar tester.

Figure 2 is a top plan view of the same as viewed from line 2—2 of Figure 1.

Figure 3 is a sectional view taken on line 3—3 of Figure 1.

Referring more particularly to the drawing, the numeral 1 indicates a housing, and the inside diameter of this housing is sufficient to freely encircle both the pipe 2 and the collar 3 which is threaded thereon, that is, an annular space 4 is provided around the collar 3 when the housing 1 is in the position shown in Figure 1. At the upper end of the housing 1 I provide a circular chamber 5, and at the lower end of the housing a similar circular chamber 6. A ring 7, formed of rubber or a flexible plastic, is positioned within the circular chamber 5. The ring 7 has a continuous construction and, under fluid pressure, is pressed inwardly to tightly engage the pipe 2 and seal off the upper end of the housing 1. A similar rubber or plastic ring 8 is mounted in the chamber 6 and seals off the lower end of the housing 1. Thus when the rings 7 and 8 are tightly pressed against the pipe 2 the annular space 4 will be sealed off at both the top and the bottom, and pressure in this annular space will be maintained so that the collar 3 and the threads 9 can be tested for possible leakage.

It may be found desirable to introduce less pressure into the chambers 5 and 6 than in the annular space 4, and if this is true then a pressure reduction valve 10 is provided and the main fluid pressure line 11 extends into this reducing valve. A pipe 12 extends from the reducing valve 10 into the circular chamber 5, and a similar pipe 13 extends from the reducing valve 10 into the circular chamber 6. Another pipe 14 extends from the valve 10 directly into the annular space 4. Fluid pressure (either hydraulic or pneumatic) may pass directly into the pipe 14 and thence into the annular space 4. This pressure may be reduced so that a lesser pressure is introduced through the pipe 12—13 and thence into the chambers 5 and 6. Under fluid pressure within the chambers 5 and 6 the rings 7 and 8 are pressed inwardly against the pipe 2 and seal both ends of the housing 1, so that leakage from the annular space 4 is prevented. Any appreciable pressure drop in the space 4 will, therefore, indicate a leak either in the threads 9 or in the collar 3. The openings 15 and 16, at the top and bottom respectively, of the housing 1, must be sufficiently large to accommodate the diameter of the collar 3, that is, the collar 3 must be able to pass freely through these openings, and also the packing rings 7 and 8 must retract sufficiently to permit the collar to pass through whenever the pressure in the chambers 5 and 6 is released.

To prevent the rubber rings 7 and 8 from extruding outwardly through the holes 15 and 16, I provide arcuate gates 17—18 at the upper end of the housing 1 and mounted thereon. These gates are slidably mounted on the housing 1, and each gate is provided with a pair of elongated slots 19 and 20 which receive pins 21 and 22 which project upwardly from the housing 1. The gates are thus guided in their horizontal movement so that they may closely encircle the pipe 2, or may be moved outwardly to permit the collar 3 to pass. The gates 17 and 18 are simultaneously moved outwardly or inwardly by means of the levers 23—24 which are pivotally mounted on top of the housing 1, and are swung on their pivots by the links 25—26, respectively, said links being attached to a cam 27. The cam is rotated manually by the lever 28 when it is necessary to move the gates. The lower opening 16 is similarly covered or uncovered by the gates 29—30, and these gates are mounted exactly in the manner as the gates 17—18, and are moved inwardly or outwardly in the manner previously described.

During the testing operation the pipe 2 must be held stationary, and this is accomplished in the usual and well known manner of slips which fit in the spider 31. The spider 31 may be an integral part of the housing 1, that is, it may be cast on the lower end thereof or otherwise attached thereto. However, a slip spider is usual and well known in the trade and the detailed construction thereof forms no part of this invention. The slip spider may be an integral part of the housing 1, if it is found desirable. However, a separate structure may accomplish the purpose of holding the pipe 2 stationary and against longitudinal movement while the testing of the collar 3 takes place.

In operation the stands of pipe 2 are lowered through the housing 1, and each collar 3 is held within the annular space 4 by placing slips in the spider 31 while the testing procedure occurs. The gates 17—18, 29 and 30 are now moved inwardly to encircle the pipe. Fluid pressure is now introduced through the pipe 11, 12, 13 and 14. The fluid pressure will move the rings 7 and 8 inwardly to pack off around the pipe 2 and seal the same. The fluid pressure in the annular space 4 will now test the collar 3 and the threads 9 by either observing pressure drop or observing leakage within the pipe 2. As soon as one collar 3 has been tested the slips are released from the pipe 2 and the pipe is then lowered to the next collar, and the test is repeated.

Having described my invention, I claim:

1. A pipe collar tester comprising a housing adapted and arranged to surround the pipe and the collar on the pipe, said housing having a circular chamber at both the top and bottom ends thereof, a packing in each of the chambers, said packing surrounding the pipe, said housing having an annular space therein positioned between said circular chambers, and pipes extending to each of the circular chambers and said annular space to conduct fluid under pressure thereto, a pair of arcuate gates mounted on the housing at both the top and bottom ends thereof, said gates covering part of said openings in one position of the gates, means mounting the gates for movement relative to the pipe, and actuating means engaging the gates to move the same relative to the pipe.

2. A pipe collar tester comprising a housing adapted and arranged to surround the pipe and the collar on the pipe, said housing having a circular chamber at both the top and bottom ends thereof, a packing in each of the chambers, said packing surrounding the pipe, said housing having an annular space therein positioned between said circular chambers, and pipes extending to each of the circular chambers and said annular space to conduct fluid under pressure thereto, said housing having openings therein at both the top and bottom ends thereof, said openings permitting the movement of a collar therethrough, a pair of arcuate gates mounted on the housing at both the top and bottom ends thereof, said gates covering part of said openings in one position of the gates, means mounting the gates for movement relative to the pipe, and actuating means engaging the gates to move the same relative to the pipe.

3. A pipe collar tester comprising a housing adapted and arranged to surround the pipe and the collar on the pipe, said housing having a circular chamber at both the top and bottom ends thereof, a continuous packing ring positioned in each of the chambers, said packing completely surrounding the pipe, said housing having an annular space therein positioned between the circular chambers, and pipes extending to each of the circular chambers and said annular space to conduct fluid under pressure thereto, the fluid in the circular chambers forcing the packing against the pipe, said housing having openings therein at both the top and bottom ends thereof, said openings permitting the movement of a collar therethrough, a pair of arcuate gates mounted on the housing at both the top and bottom ends thereof, said gates covering part of said openings in one position of the gates, means mounting the gates for movement relative to the pipe, and actuating means engaging the gates to move the same relative to the pipe.

References Cited in the file of this patent

UNITED STATES PATENTS

| | | |
|---|---|---|
| 2,255,921 | Fear | Sept. 16, 1941 |
| 2,264,515 | Fear | Dec. 2, 1941 |
| 2,481,013 | Henderson | Sept. 6, 1949 |
| 2,532,818 | Langel | Dec. 5, 1950 |
| 2,587,192 | Meyer | Feb. 26, 1952 |